United States Patent [19]

Stuart

[11] Patent Number: 5,184,599

[45] Date of Patent: Feb. 9, 1993

[54] MULTIPLE DOOR/TRAY COOKER, SMOKER AND GRILL

[76] Inventor: Clifford H. Stuart, P.O. Box 65, Canal Point, Fla. 33438

[21] Appl. No.: 897,894

[22] Filed: Jun. 12, 1992

[51] Int. Cl.$^5$ .............................................. A47J 37/00
[52] U.S. Cl. .............................. 126/25 R; 126/37 B; 126/41 D; 126/9 R; 99/401; 99/402; 99/467
[58] Field of Search ............... 126/25 R, 340, 9 R, 126/38, 37 B, 41 D; 99/401, 340, 402, 393, 467, 481, 482

[56] References Cited

U.S. PATENT DOCUMENTS

| | | | |
|---|---|---|---|
| 762,401 | 6/1904 | Hall | 99/401 |
| 2,611,357 | 9/1952 | Turner | 126/25 R |
| 3,088,395 | 5/1963 | Miller | 99/340 |
| 3,375,775 | 4/1968 | Folmar | 99/401 X |
| 4,069,806 | 1/1978 | Landry | 126/9 R |
| 4,706,817 | 11/1987 | Greathouse | 126/9 B X |
| 4,862,792 | 9/1989 | Lerma, Jr. | 126/25 R X |
| 4,962,696 | 10/1990 | Gillis | 126/25 R X |
| 5,031,602 | 7/1991 | Vick | 126/25 R X |

FOREIGN PATENT DOCUMENTS 37392 5/1886 Fed. Rep. of Germany ..... 126/9 R

Primary Examiner—Larry Jones
Attorney, Agent, or Firm—Malin, Haley, McHale, DiMaggio & Crosby

[57] ABSTRACT

A self-contained cooker and grill having quadrilateral doors with a separate cooking grate attached to each door. Closure of all doors provide a conventional barbecue type cooker or smoker with a full sized grate and a common area for support of solid fuels. The multiple door cooker allows the operator to vary cooking times and heating of four different cooking surfaces. Each door can be opened independently allowing the operator to access the immediate cooking surface without disrupting the remaining cooking surfaces. An upper grate is provided in a fixed, movable, or rotational arangement for adaptation to various cooking requirement.

16 Claims, 2 Drawing Sheets

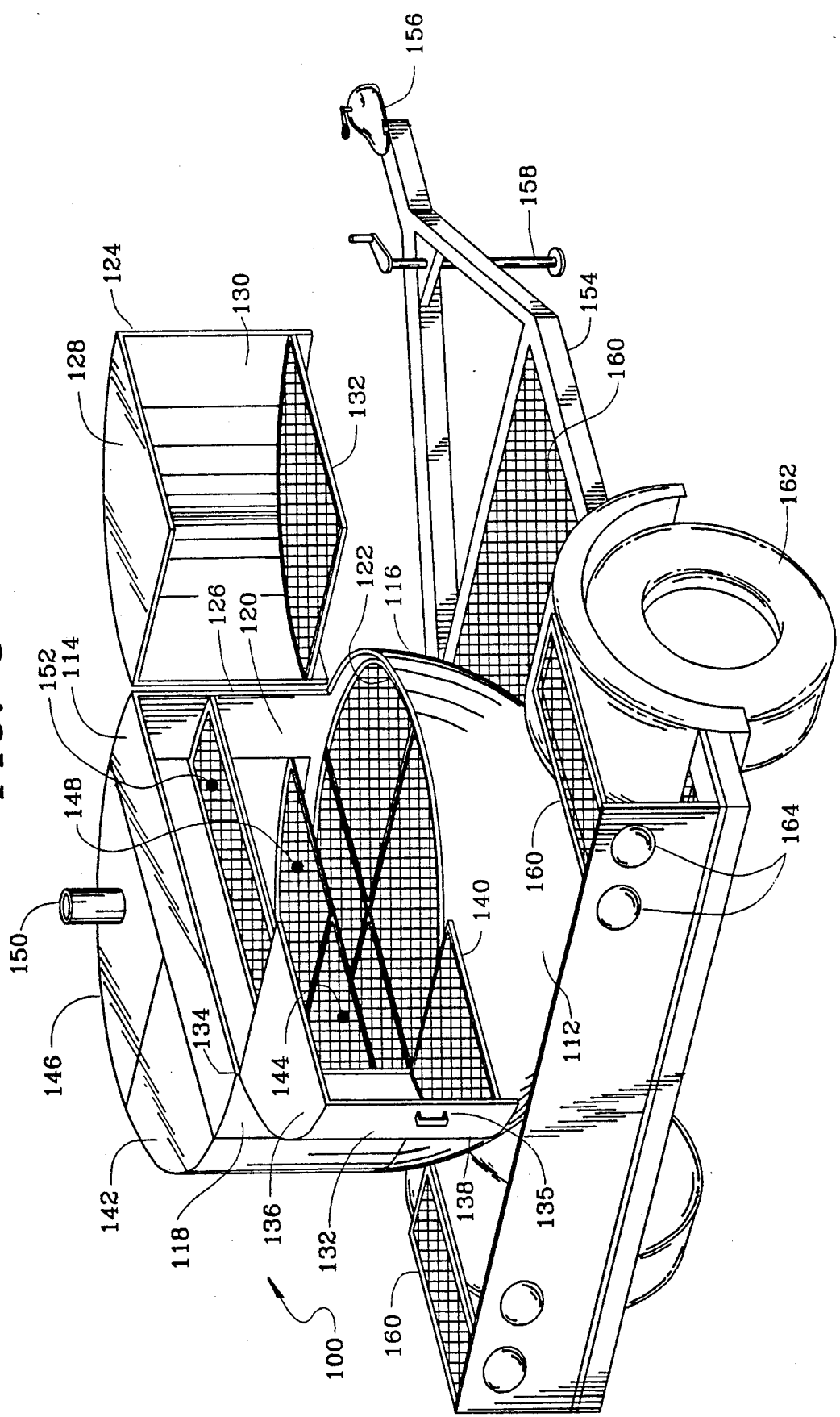

MULTIPLE DOOR/TRAY COOKER, SMOKER AND GRILL

BACKGROUND OF THE INVENTION

1. Field of the Invention

This invention relates generally to outdoor cooking devices and, more particularly, to a multiple door cooker and grill which permits the simultaneous cooking on individual cooking surfaces independently accessible by movement of an access door associated with each cooking surface.

2. Description of the Prior Art

Outdoor cooking devices are well known for their ability to provide naturally flavored food. Typically the cooking device is fueled by an open fire consisting of wood or coal wherein the food drippings help in the flavoring of the food. Alternatively the cooking device can be fueled by a gas burner. Since open fires present unsuitable risks for indoor use, the public has come to rely upon specially designed cooking devices for controlling the open fires in the outdoor environment. Critical to the proper outdoor cooking of food includes the means for regulating the heat of the open fire as well as timing the length of food exposure to the heat. The use of a cover is most effective in controlling the fuel source by limiting oxygen required for combustion purposes. The cover further providing increased heat transfer all areas of the food.

A problem with the outdoor cooker is created in part by use of a cover in that removal of the cover is required for tending of the food. This removal allows the oxygen to reach the fuel source which may result in a fuel flare up that can char the food and more importantly the operator's hand. For this reason, a number of cooking devices disclose the use of moveable food grates allowing the operator to tend the food eliminating the possibility of operator harm due to fuel flares.

U.S. Pat. No. 3,976,000 issued 1976 to Oxel discloses a rotatable rack for use in an oven in which the opening of the door causes the outward rotation of a cooking rack. Similarly, U.S. Pat. No. 4,683,871 issued 1987 to Salvi discloses a rack attached to a rotatable door for use in an oven. Likewise, U.S. Pat. No. 4,862,792 issued 1989 to Lerma discloses a barbecue grille with a swing-out food grate.

Despite the ability of the prior art in prevent operator burns, an additional problem has developed as a result of the door attached cooking surfaces, namely, the entire cooking surface is moved away from the cooking surface for operator access. Although such movement is appropriate to prevent operator harm, it is inappropriate when different foods are to be cooked or various cooking times are needed. For instance, if steak and potatoes are cooked simultaneously, it is not desirable to disturb the potatoes when the steak needs to be turned. This separability of cooking surfaces is not taught by the prior art and is a primary objective of this invention.

Thus, what is needed in the art is a cooking grill that provides the operator with all the advantages of door mounted grate removal and provides a means for maintaining continuous cooking times for those foods that do not require operator attention.

SUMMARY OF THE INVENTION

In accordance with the present invention, it is a primary object thereof to provide an improved outdoor self-contained cooker providing four separate cooking sections utilizing a common solid fuel source. The cooker utilizes four separate cooking grates, each grate connected to a separate and independently rotatable door allowing the operator to access a single cooking surface without affecting the remaining cooking surface. The framework is based upon a substantially circular housing having a top and bottom and curved side wall. The side wall includes four side wall closure doors that are adapted to swing on a substantially vertical axis between a closed position and an open position. Each side wall closure door includes the cooking surface or grate coupled to the inner surface of each door adapted to provide a horizonal support surface for support of food items. A lower removable grate is provided at a predetermined position above the inner surface of the lower closure panel providing a means for support of the solid fuel such as wood or coal. The common fuel source provides uniform heating throughout the housing.

By use of the separate doors, the housing of the instant invention can be further divided into separate cooking chambers by the use of impervious baffles defining two or four interior chambers. Each chamber accesses the common heat source by use of a centrally disposed aperture which fluidly communicates each chamber through the lower interior chamber. The baffles are especially useful to prevent commingling of flavors when disparate foods are cooked within the same cooker.

Thus, another object of the instant invention to provide a separate and distinct doors for individual cooking sections, each said door having a horizontal cooking grate coupled thereto. The movement of the door places the respective cooking grate in proper relation to the fuel source while allowing free movement of the grate away from the fuel source for operator accessibility.

It is yet another object of the instant invention to provide the movement of the cooking grate in relation to movement of the respective door thereby reducing the danger associated with working over an open fire.

Yet another object of the instant invention is to provide separately accessible cooking surfaces having the combined cooking surface area of a conventional single piece grate.

Yet still another object of the instant invention is to a smoker providing separately accessible sections having a combined heating.

In accordance with these and other objects which will become apparent hereinafter, the instant invention will now be described with particular reference to the accompanying drawings.

BRIEF DESCRIPTION OF THE DRAWINGS

FIG. 3 is a perspective view of an industrial version of the cooker device installed upon a portable trailer.

DETAILED DESCRIPTION OF THE PREFERRED EMBODIMENT

Figure 1:
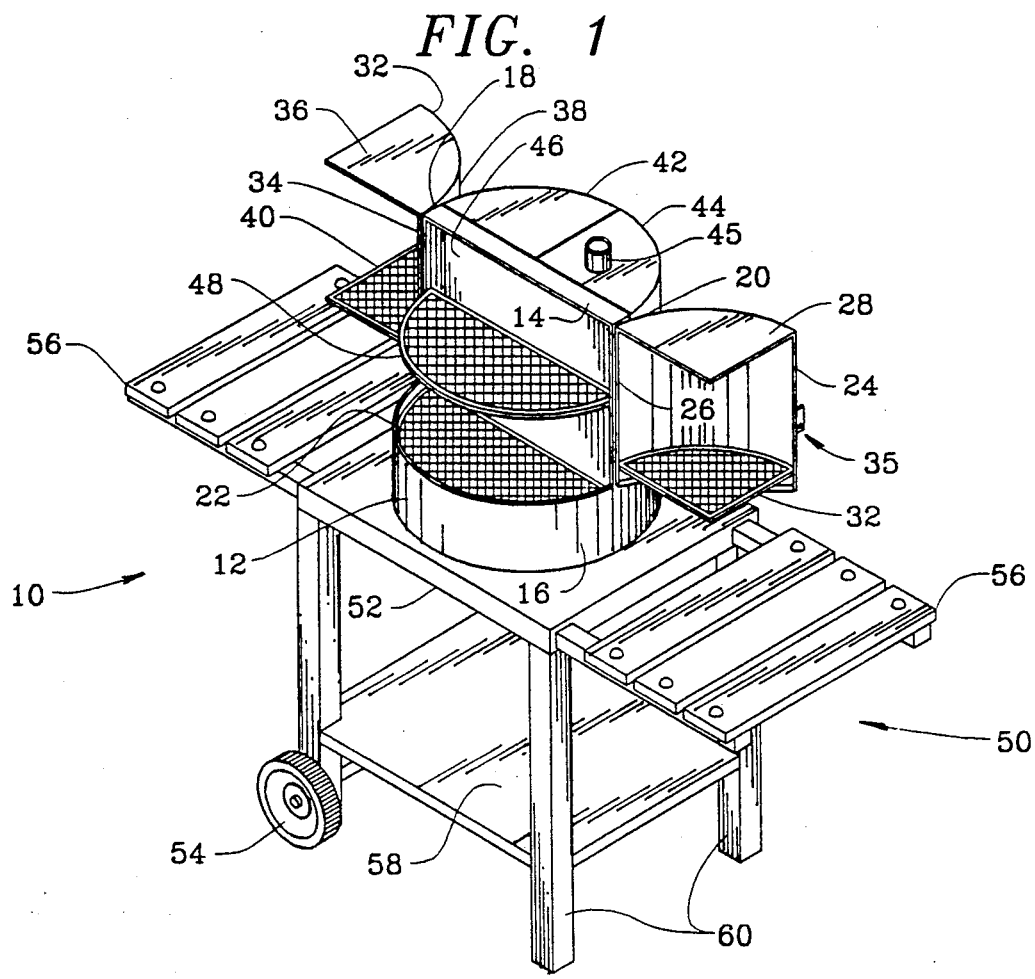
FIG. 1 is a perspective view of the instant invention having a single baffle to form two volumes, the cooker supported by a movable cart.

Now referring to FIG. 1, shown is the self-contained solid fuel cooker and grill 10 of the instant invention. A housing 12 is provided having a top closure panel 14 and a substantially circular bottom closure panel 16. The top panel 14 and the bottom panel 16 are placed in horizontally parallel planes and connected together by a first curved vertical side wall 18 and a second curved side wall 20 placed opposite to the first side wall 18.

A lower removable grate 22 is positioned above the bottom closure panel 16 defining a lower interior chamber. The lower grate 22 provides a means for support of solid fuel such as wood and coal. A second lower grate, not shown, can be placed within the lower interior chamber for actual support of the solid fuel allowing the lower grate 22 to act a barrier between the fuel source and to prevent dropping food or cooking utensils directly upon the fuel source.

Quadrilateral side wall closure doors provide support for cooking grates and constitute the remainder of the side wall. The first door 24 is connected to a first side edge 26 of the first side wall 20 and is adapted to swing on a substantially vertical axis between a closed position and, as shown in this figure, an open position. The door 24 is formed from a top closure panel 28 and a curved side wall 30. A door grate 32 is attached to the inner surface of the door 30 adapted to provide a horizonal support surface for moving food items over the lower grate 22 in response to movement of the door 30. The second door 32 is connected to a first side edge 34 of the second side wall 18 adapted to swing on a substantially vertical axis between a closed position and, as shown in this figure, an open position. The door 32 is formed from a top closure panel 36 and a curved side wall 38. A door grate 40 is attached to the inner surface of the door 32 adapted to provide a horizonal support surface for moving food items over the lower grate 22 in response to movement of the door 32. The first door 24 operatively associated with the second door 32 forming a continuous side wall between the first side edge 34 of the first side wall 18 and the first side edge 26 of the second side wall 20. A latch 35 provides a means for holding the first door 24 and second door 32 in a closed position. It should be noted that the latch mechanism can also be installed to latch each door individually to the bottom closure panel and is deemed within the scope of this invention. A third door 42 is connected to a second side edge of the first side wall 18 and adapted to swing on a substantially vertical axis between an open position and, as shown in the figure, a closed position. A fourth door 44 is connected to a second side edge of the second side wall 20 and adapted to swing on a substantially vertical axis between an open position and, as shown in the figure, a closed position. An adjustable exhaust outlet 45 can be placed in one of the top closure panels to prevent excess pressure from building within the housing when all the doors are closed. A plurality of adjustable slots, not shown, are provided for air draft to the fuel while cooking. In addition, a clean out port can be provided in near the bottom for removal of ash.

Optional to this embodiment is the use of an impervious baffle 46 defining a centrally disposed aperture thereunder allowing the fuel source to heat both sides of the volume. The baffle has an outer peripheral edge sealingly attached to the first and second side wall 18 and 20, such that an upper portion of said interior chamber is partitioned into two volumes. Since heat rises, the independent chambers allow for a greater retention of heat when any door of an opposite volume is opened. The use an upper grate 48 is shown for providing a warming surface distinct from the cooking surface. The upper grate 48 can be fixed, as illustrated, or movably attached at one end of the grate so as to allow movement of one end of the shelf outward from the fixed position. Alternatively, the upper grate can be replaced with a rotating pinion drive for roasting purposes.

Further illustrated is a stand 50 providing a base 52 for the cooker 12 allowing the operator to service a smaller sized cooker at waist level. The stand 50 is made portable by wheels 54 and is shown with conventional wood racks 56 and a lower rack 58 for storage. Movement of the stand 50 is accomplished by lifting the legs 60 off the ground and using the wheels 54 to allow ease of movement to another location.

Figure 2:
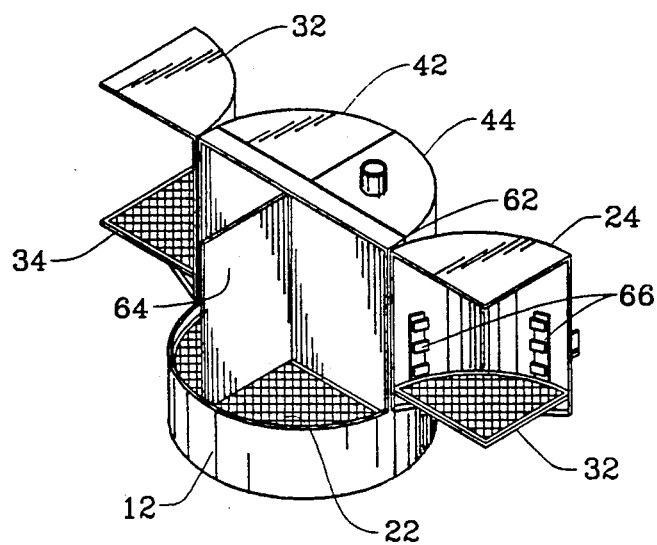
FIG. 2 is a perspective view of the cooker device having a cross baffle to form four volumes.

Now referring to FIG. 2, shown is an alternative embodiment of the instant invention wherein a removable impervious baffle 62 includes a second baffle 64 placed perpendicular to the first baffle 62 creating an upper portion that is partitioned into four volumes. The cross shaped baffle also defining a centrally disposed aperture thereunder allowing the fuel source to heat all four volumes. The cross shaped baffle can be made removable and simply placed upon the grate 22 if independent sections are desired. Similar to the above described configuration, doors 24, 32, 42, and 44 provide the side wall of the housing 12 with the grates attached to each door. Door mounted grates may include an adjustment means 66 to vary the height of the grate 32 over the surface of the fuel grate cover 22.

Now referring to FIG. 3, shown is an industrial embodiment of the self-contained solid fuel cooker and grill 100 of the instant invention. A housing 112 is provided having a top closure panel 114 and a substantially circular dome shaped bottom closure panel 116. The top panel 114 and the bottom panel 116 are connected together by a first curved vertical side wall 118 and a second curved side wall 120 placed opposite to the first side wall 118.

A lower removable grate 122 is positioned above the dome shaped bottom closure panel 116 defining a lower interior chamber. The lower grate 122 provides a cover for a second grate, not shown, placed within the lower interior chamber for actual support of the solid fuel allowing the lower grate 122 to act a barrier between the goals prevent the dropping materials directly upon the fuel source. The grate 122 is formed in sections allowing ease of removal for cleaning purposes.

Quadrilateral side wall closure doors provide support for cooking grates and provide the remainder of the side wall. The first door 124 is connected to a first side edge 126 of the first side wall 120 and is adapted to swing on a substantially vertical axis between a closed position and, as shown in this figure, an open position. The door 124 is formed from a top closure panel 128 and a curved side wall 130. A door grate 132 is attached to the inner surface of the door 30 adapted to provide a horizonal support surface for moving food items over the lower grate 122 in response to movement of the door 130. The second door 132 is connected to a first side edge 134 of the second side wall 118 adapted to swing on a substantially vertical axis between a closed position and, as shown in this figure, an open position. The door 132 is formed from a top closure panel 136 and a curved side wall 138. A door grate 140 is attached to the inner surface of the door 132 adapted to provide a horizonal support surface for moving food items over the lower grate 122 in response to movement of the door 132. The first door 124 operatively associated with the second door 132 forming a continuous side wall between the first side edge 134 of the first side wall 118 and the first side edge 126 of the second side wall 120. A handle/latch 135 provides a means for holding the first door 124 and second door 132 in a closed position. It should be noted that the latch mechanism can also be installed to latch each door individually to the bottom closure panel and is deemed within the scope of this invention. A third door 142 is connected to a second side edge of the first side wall 118 and adapted to swing on a substantially vertical axis between an open position and, as shown in the figure, a closed position. Door grate 144 is attached to the inner surface of the third door 142. A fourth door 146 is connected to a second side edge of the second side wall 120 and adapted to swing on a substantially vertical axis between an open position and, as shown in the figure, a closed position. Door grate 148 is attached to the inner surface of the third door 146 An adjustable exhaust outlet 150 can be placed in one of the top closure panels to prevent excess pressure from building within the housing when all the doors are closed. A fixed upper grate 152 is shown for providing a warming surface distinct from the cooking surface.

The industrial variation of the instant invention is transported by use of a wheeled trailer having a trailer hitch 156 and a jack stand 158 for leveling. Grates 160 allow the operator access to the cooker. Tires 162 and lights 164 allow for legal transportation of the cooker of U.S. roadways. The unique quality of the four door industrial cooker is the ability to cook over one single cooking grill while accessing a second grill. Thus, each section can could at staggered intervals allowing the operator to produce freshly cooked food at sequential intervals.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A self contained solid fuel cooker and grill comprising:
    a housing means comprised of a top closure panel and a bottom substantially circular closure panel placed in horizontally parallel planes connected to a first curved side wall and a second curved wall placed opposite to said first side wall;
    a lower removable grate means positioned above said bottom closure panel defining a lower interior chamber, said lower grate providing a means for support of solid fuel;
    quadrilateral side wall closure doors defined by a first door connected to a first side edge of said first side wall and adapted to swing on a substantially vertical axis between a closed position and an open position, a second door connected to a first side edge of said second side wall and adapted to swing on a substantially vertical axis between a closed position and an open position, said first door operatively associated with said second door forming a continuous side wall between said first side edge of said first side wall and said first side edge of said second side wall, a third door connected to a second side edge of said first side wall and adapted to swing on a substantially vertical axis between a closed position and an open position and a fourth door connected to a second side edge of said second side wall and adapted to swing on a substantially vertical axis between a closed position and an open position, said third door operatively associated with said fourth door forming a continuous side wall between said second side edge of said first side wall and said second side edge of said second side wall; and
    a door grate means attached to each of said quadrilateral doors, each said door grate coupled to an inner surface of said door adapted to provide a horizonal support surface for moving food items over said lower grate in response to movement of said respective door;
    whereby closure of said doors provides an enclosed interior with four distinct and separate cooking surfaces commonly heated by a single source and each cooking surface independently accessible in response to movement of said respective door.

2. The cooker recited in claim 1 wherein said housing side wall defines an elliptical section when viewed normal to said top and bottom closure panels.

3. The cooker recited in claim 1, wherein said housing includes an impervious means for baffling defining a centrally disposed aperture thereunder, said means for baffling having an outer peripheral edge sealingly attached to said first and second side wall such that an upper portion of said interior chamber is partitioned into two volumes.

4. The cooker recited in claim 1, wherein said housing includes an impervious means for baffling defining a centrally disposed aperture thereunder, said means for baffling having an outer peripheral edge sealingly attached to said side wall such that an upper portion of said interior chamber is partitioned into four volumes.

5. The cooker recited in claim 1, wherein said interior chamber includes an impervious means for baffling defining a centrally disposed aperture therethrough, said means for baffling having an outer peripheral edge sealingly attached to said side wall such that an upper portion of said interior chamber is partitioned into four volumes.

6. The cooker recited in claim 1, wherein said upper closure panel includes a means for exhausting excess heat through said upper closure when said closure doors are closed.

7. The cooker recited in claim 1, wherein said closure doors each have a means for coupling said door in a closed position.

8. The cooker recited in claim 7, wherein said means for coupling is located on said first and second doors depending the closure status jointly to either said first or second door.

9. The cooker recited in claim 7, wherein said means for coupling is located on said third and fourth doors depending the closure status jointly to either said third or forth door.

10. The cooker recited in claim 1 further comprising at least one upper grate disposed between said first and second side wall providing a horizontal cooking surface accessible by opening any of said closure doors.

11. The cooker recited in claim 1 further comprising at least one upper grate permanently fixed between said first and second side wall providing at least one fixed horizontal cooking surface accessible by opening any of said closure doors.

12. The cooker recited in claim 1 further comprising: a wheel-supported base frame and a means for coupling said lower closure housing to said base frame.

13. The cooker recited in claim 1 wherein said doors include a means for adjustably positioning said door grates.

14. The cooker recited in claim 1 wherein said lower closure panel is further defined as an inverted dome having a lower grate for support of solid fuels.

15. The cooker recited in claim 10 wherein said upper grate is fixed between said first and second side wall providing a permenant horizontal cooking surface accessible by opening any of said closure doors.

16. A self-contained solid fueled cooker and grill comprising:

a housing means comprised of a top closure panel and a bottom substantially circular closure panel placed in horizontally parallel planes connected to a first curved side wall and a second curved wall placed opposite to said first side wall;

at least one lower removable grate means positioned in said bottom closure panel defining a lower interior chamber, said lower interior chamber providing a means for support of solid fuel;

quadrilateral side wall closure doors defined by a first door connected to a first side edge of said first side wall and adapted to swing on a substantially vertical axis between a closed position and an open position, a second door connected to a first side edge of said second side wall and adapted to swing on a substantially vertical axis between a closed position and an open position, said first door operatively associated with said second door forming a continuous side wall between said first side edge of said first side wall and said first side edge of said second side wall, a third door connected to a second side edge of said first side wall and adapted to swing on a substantially vertical axis between a closed position and an open position and a fourth door connected to a second side edge of said second side wall and adapted to swing on a substantially vertical axis between a closed position and an open position, said third door operatively associated with said fourth door forming a continuous side wall between said second side edge of said first side wall and said second side edge of said second side wall;

an impervious means for baffling defining a centrally disposed aperture thereunder by means of said lower interior chamber, said means for baffling having an outer peripheral edge sealingly attached to said first and second side wall such that an upper portion of said interior chamber is partitioned into at least two separate volumes;

a plurality of upper grates permanently fixed between said first and second side wall providing a fixed horizontal cooking surface accessible by opening a closure door collinear to said grate;

a door grate means attached to each of said quadrilateral doors, each said door grate coupled to an inner surface of said door adapted to provide a horizonal support surface for moving food items over said lower grate in response to movement of said respective door; and means for coupling each said door in a closed position;

whereby closure of said doors provides an enclosed interior with four distinct and separate cooking surfaces commonly heated by a single source and each cooking surface independently accessible in response to movement of said respective door.

* * * * *